Dec. 5, 1944.　　　　J. N. FEES　　　　2,364,282
GRAIN LOADER
Filed July 19, 1943　　　2 Sheets-Sheet 1

Inventor
John N. Fees
By
*Attorney*

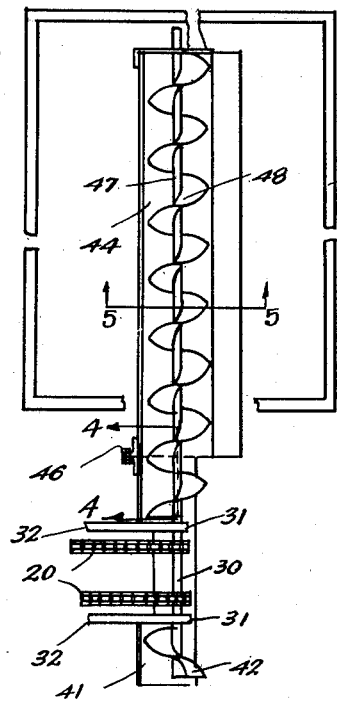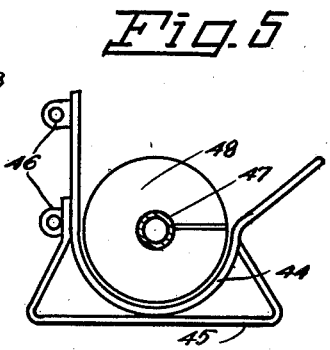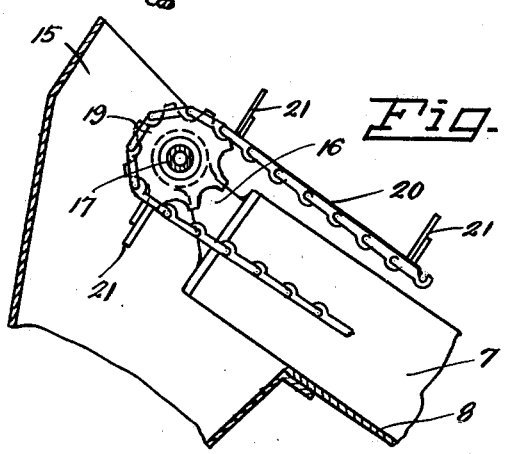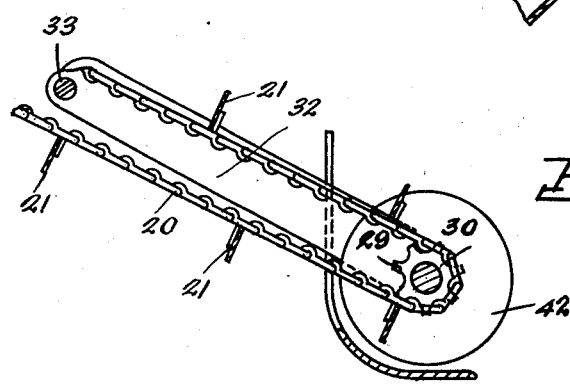

Patented Dec. 5, 1944

2,364,282

UNITED STATES PATENT OFFICE 2,364,282

GRAIN LOADER

John N. Fees, Spokane, Wash.

Application July 19, 1943, Serial No. 495,320

4 Claims. (Cl. 198—9)

This invention relates to a conveyor and it is one object of the invention to provide a portable conveyor which is particularly adapted for removing grain or the like from a pile, bin, building, or other storage place and carry the grain upwardly for dumping it into a wagon or other conveyance used for transporting the grain from one place to another.

Another object of the invention is to so form the conveyor that it may be easily moved from one place to another and progressively advanced toward a pile of grain as the grain is removed from the pile and deposited in wagons.

Another object of the invention is to provide the conveyor with a frame or carriage carrying the conveyor trough and also carrying a motor for driving the conveyor in the trough and a fuel tank for the motor.

Another object of the invention is to provide an auxiliary conveyor mounted at the front of the frame or carriage in cooperating relation to the main conveyor, the auxiliary conveyor being tiltable vertically to adjusted positions so that grain may be removed from a point close to the bottom of a pile or at a point above the ground or floor upon which the grain rests.

Another object of the invention is to provide the auxiliary conveyor with a counterweight and thus make it easy to raise the auxiliary conveyor to elevated position and support it in adjusted position.

Another object of the invention is to provide a portable conveyor which is simple in construction, cheap to make, and not liable to become damaged when subjected to rough usage.

In the accompanying drawings:

Fig. 3 is a view showing a supplementary screw conveyor applied to the auxiliary conveyor for removing grain from a bin or small building.

Fig. 4 is a sectional view on an enlarged scale taken on the line 4—4 of Fig. 3.

Fig. 5 is a sectional view on an enlarged scale taken transversely through the supplementary screw conveyor on the line 5—5 of Fig. 3.

Fig. 6 is a sectional view on an enlarged scale taken longitudinally through the main conveyor on the line 6—6 of Fig. 2.

Fig. 7 is a sectional view taken longitudinally through the lower portion of the main conveyor on the line 7—7 of Fig. 2.

Figure 1:
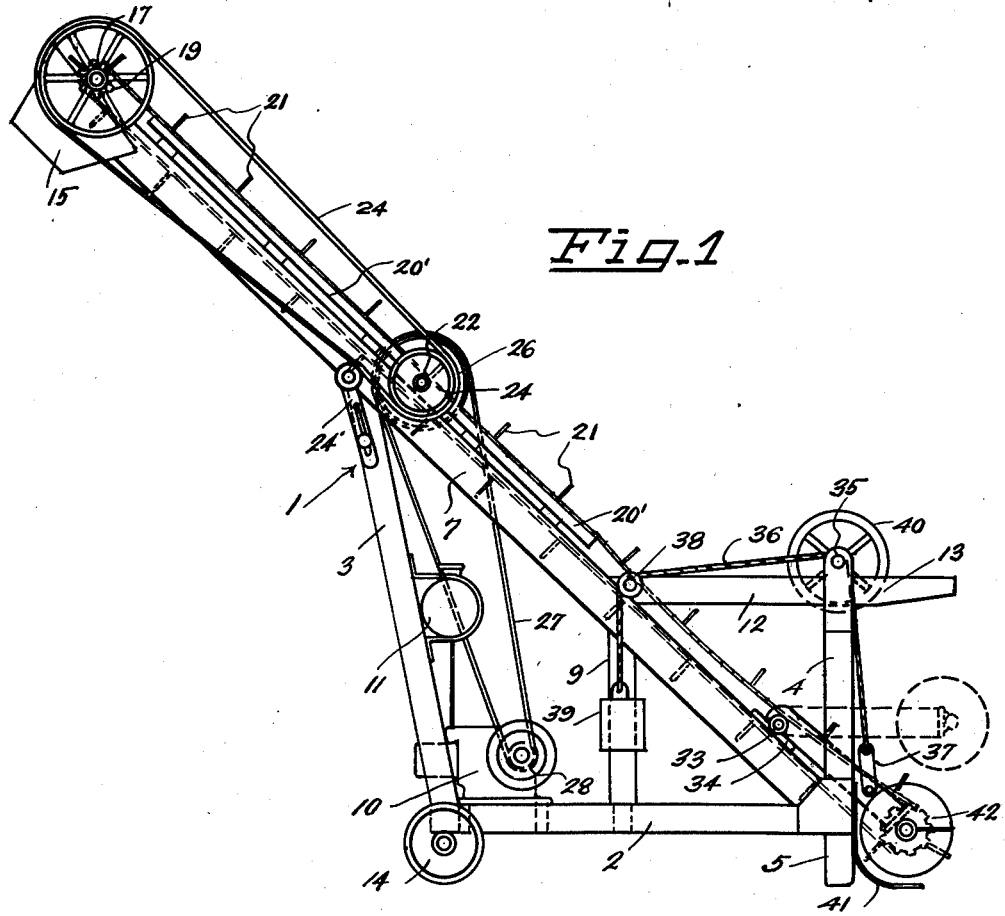
Fig. 1 is a side elevation of the improved conveyor.
Figure 2:
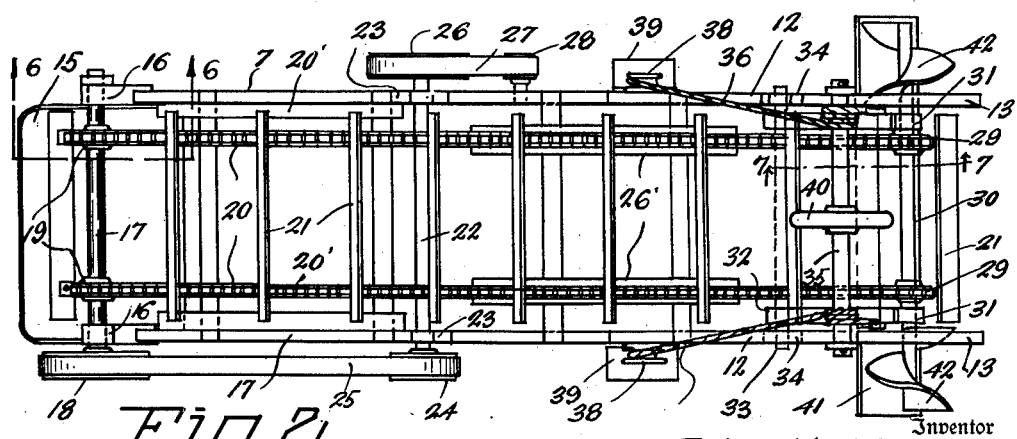
Fig. 2 is a top plan view thereof.

This elevator has a frame 1 consisting of a carriage 2 provided at one end with upstanding bars 3 and at its other end with posts 4 which extend downwardly below the frame to form feet 5 and are connected with the frame by plates 6 which also connect the carriage and posts with side rails or walls 7 of a conveyor trough 8. The trough extends forwardly at an upward incline and is supported on upper ends of the supports 3 with its forward portion projecting from the frame at such a height that it will extend over a wagon box when a wagon is driven under the projecting portion of the conveyor. The trough is braced by struts 9 located substantially midway the length of the carriage, it being understood that additional struts and braces may be provided if necessary. An engine 10 is mounted on the forward portion of the carriage and above the engine is a fuel tank 11 carried by the supports 3. Bars 12 extend horizontally above the rear portion of the conveyor trough with their inner front ends secured to side rails of the trough and their rear portions secured to the posts 4 and projecting rearwardly therefrom to form handles 13. By grasping the handles, the frame may be tilted and rolled upon wheels at the front end of the carriage from one place to another and then brought to a stop with the feet 5 resting on the ground to support the rear end of the machine and prevent it from shifting out of its proper position. A spout at the upper end of the trough extends outwardly therefrom at a downward incline so that grain delivered from the conveyor will be directed into a wagon under the conveyor.

The conveyor trough may be of any length desired and, at its upper end, carries bearings 16 which rotatably receive a shaft 17 extending across the upper end of the conveyor trough. This shaft carries a large pulley 18 at one end and also carries sprocket wheels 19 about which are trained side chains 20 of an endless conveyor having the usual cross plates 21 for moving grain upwardly through the trough. Strips 20' support the upper flight of the endless conveyor. A drive shaft 22 extends across the trough adjacent upper ends of the supports 3 and is rotatably mounted in bearings 23. At one end, the drive shaft carries a pulley 24 about which is trained a belt 25 for transmitting rotary motion to shaft 17. At its other end, the drive shaft carries a pulley 26 about which is trained a belt 27, and this belt is trained about the pulley 28 of the engine 10. Since the pulley 26 is smaller than pulley 27 and pulley 24 is smaller than pulley 18, there will be an appreciable reduction in speed between the engine shaft and the shaft 16 and the endless conveyor will be moved through the trough at an appropriate speed. A belt tightener 29' engages belt 24 and a similar tightener may be provided for the belt 27.

Lower ends of the endless chains 20 of the conveyor are engaged about sprocket wheels 29 carried by a shaft 30 which is rotatably mounted through bearings 31 at outer ends of bars 32. These bars 32 extend longitudinally of the conveyor trough in rearwardly projecting relation thereto and their inner ends are mounted on a shaft 33 which is rotatably received in bearings 34 carried by the side walls or rails of the trough 8. It will thus be seen that the bars 32 will be pivotally mounted and may be swung vertically to adjusted positions. In order to accomplish vertical adjustment of the bars 32 there has been provided a shaft 35 about which are wrapped cables 36 having portions extending downwardly therefrom and secured to links 37 carried by the bars 32. The cables extend forwardly from the shaft 35 and are engaged with guide pulleys 38 from which they extend downwardly and have weights 39 serving as counterweights for the bars 32. A hand wheel 40 is fixed to the shaft 35 and when this wheel is turned the shaft 35 will be rotated and the cables shifted longitudinally to raise or lower the bars 32 where they will be held by action of the counterweights. A shoe or lip 41 is secured against lower portions of the supports 4 and projects outwardly under the sprockets 29 and portions of the sprocket chains 20 trained about them, and, from an inspection of Figs. 1 and 7, it will be seen that this lip will readily enter a pile of grain and also direct grain engaged by the blades 21 to the lower end of the trough 8, up which it is then carried to the spout 15. The shoe or lip projects from opposite sides of the auxiliary frame formed by bars 32 and carries screw conveyors 42 which feed grain inwardly toward the shoe for engagement by the blades 22 of the endless conveyor. At times it is desired to remove from a bin or building 43 having a small entrance which will not accommodate the front end of the grain elevator. In such cases, an auxiliary trough having feet 45 is connected with an end of the shoe 41 by bolts passed through ears 46. The screw conveyor 42 upon this end of shaft 30 is removed and the sleeve or tubular shaft 47 of the screw propeller 48 secured to the shaft 30 by set screws 49. This elongated screw propeller extends the full length of trough 44 and the trough extends into the bin or building 43 a distance sufficient that the grain therein may be conveyed outwardly to the shoe and along the shoe to the central portion thereof where it will be engaged by the blades 21 and carried up the trough 8. The auxiliary troughs and conveyors may also be applied when removing grain from large piles and conveying the grain to the endless conveyor.

Having thus described the invention, what is claimed is:

1. A grain elevator comprising a main frame, a trough carried by said main frame and extending rearwardly at an upward incline, an auxiliary frame projecting from the front end of the main frame and having its inner end pivoted to the lower end of said trough for vertical swinging movement to angularly adjusted positions, a shoe at the outer end of said auxiliary frame, a shaft rotatably mounted across the upper end of said trough, a shaft rotatably mounted across the lower outer end of the auxiliary frame above said shoe, an endless conveyor extending longitudinally through the trough and the auxiliary frame and trained about said shafts, an adjusting shaft rotatably mounted across the main frame over said auxiliary frame, guides at opposite sides of said trough, cables connected to opposite sides of said auxiliary frame and extending upwardly therefrom and wound about said adjusting shaft and having portions extending therefrom and engaged with said guides and extending downwardly from the guides, counterweights for said auxiliary frame suspended from the depending ends of said cables, and means for imparting rotary motion to the upper shaft and moving said endless conveyor through said trough.

2. A grain elevator comprising a main frame, a trough carried by said main frame and extending rearwardly at an upward incline, an auxiliary frame projecting from the front end of the main frame and having its inner end pivoted to the lower end of said trough for vertical swinging movement to angularly adjusted positions, a shaft rotatably mounted across the upper end of said trough, a shaft rotatably mounted across the lower outer end of the auxiliary frame, an endless conveyor extending longitudinally through the trough and the auxiliary frame and trained about said shafts, an adjusting shaft mounted across the main frame over said auxiliary frame, a pulley at a side of said trough, a cable attached to the auxiliary frame and extending upwardly therefrom and wrapped about the adjusting shaft and then extending therefrom rearwardly of the main frame and engaged with the pulley with its inner end portion extending downwardly from the pulley, a counterweight at the inner end of said cable, a drive shaft rotatably mounted across said trough, pulleys carried by one end of said drive shaft and the shaft at the upper end of said trough, a belt trained about said pulleys, a motor on said main frame at the rear end of its lower portion, pulleys carried by the motor and the other end of the drive shaft, and a belt trained about the last mentioned pulleys for transmitting rotary motion from said motor to said drive shaft.

3. A grain elevator comprising a main frame, a trough carried by said main frame and extending rearwardly at an upward incline, an auxiliary frame projecting from the front end of the main frame and having its inner end pivoted to the lower end of said trough for vertical swinging movement to angularly adjusted positions, a shoe at the outer end of said auxiliary frame, a shaft rotatably mounted across the upper end of said trough, a shaft rotatably mounted across the lower outer end of the auxiliary frame above said shoe, an endless conveyor extending longitudinally through the trough and the auxiliary frame and trained about said shafts, a shoe carried by the main frame and projecting therefrom under the lower shaft and from opposite sides of the outer end of said auxiliary frame, an auxiliary trough alined with one end of said shoe and detachably secured thereto and projecting from a side of the main frame, a screw conveyor rotatably mounted in said auxiliary trough and having a tubular shaft detachably secured about the adjacent end portion of the lower shaft, and means for imparting rotary motion to the upper shaft and moving said endless conveyor through the first trough.

4. In an elevator of the character described, a main frame, a main conveyor carried by said main frame and extending rearwardly at an upward incline, an auxiliary conveyor pivoted adjacent the lower end of the main conveyor and projecting from the front end of the main frame, uprights at the front end of the main frame located at opposite sides of the main conveyor, side bars extending between upper portions of the uprights and opposite sides of the main conveyor, an adjusting shaft extending between and rotatably mounted at upper ends of said uprights, pulley wheels mounted at inner ends of said side bars, cables connected with opposite sides of said auxiliary conveyor and extending upwardly therefrom with portions wrapped about the adjusting shaft and other portions extending rearwardly therefrom and trained about the pulley wheels with their inner end portions extending downwardly from the pulley wheels, weights suspended from inner ends of said cables, and a wheel carried by said adjusting shaft for rotating the shaft and moving the cables longitudinally for vertically adjusting the position of the auxiliary conveyor.

JOHN N. FEES.